N. Martz.

Horse Rake.

No 2694 Reissued Jul. 23, 1867.

N. PETERS, PHOTO-LITHOGRAPHER, WASHINGTON, D. C.

United States Patent Office.

ADAM R. REESE, OF PHILLIPSBURG, NEW JERSEY, ASSIGNEE OF NATHAN MARTZ.

*Letters Patent No.* 14,321, *dated February* 26, 1856; *reissue No.* 2,694, *dated July* 23, 1867.

IMPROVEMENT IN HORSE-RAKES.

The Schedule referred to in these Letters Patent and making part of the same.

TO ALL WHOM IT MAY CONCERN:

Be it known that NATHAN MARTZ, of Briar-Creek township, in the county of Columbia, and State of Pennsylvania, did invent certain new and useful Improvements in Horse-Rakes, of which the following is a full, clear, and exact description, reference being had to the accompanying drawings, which make part of this specification, and in which—

Figure 1:
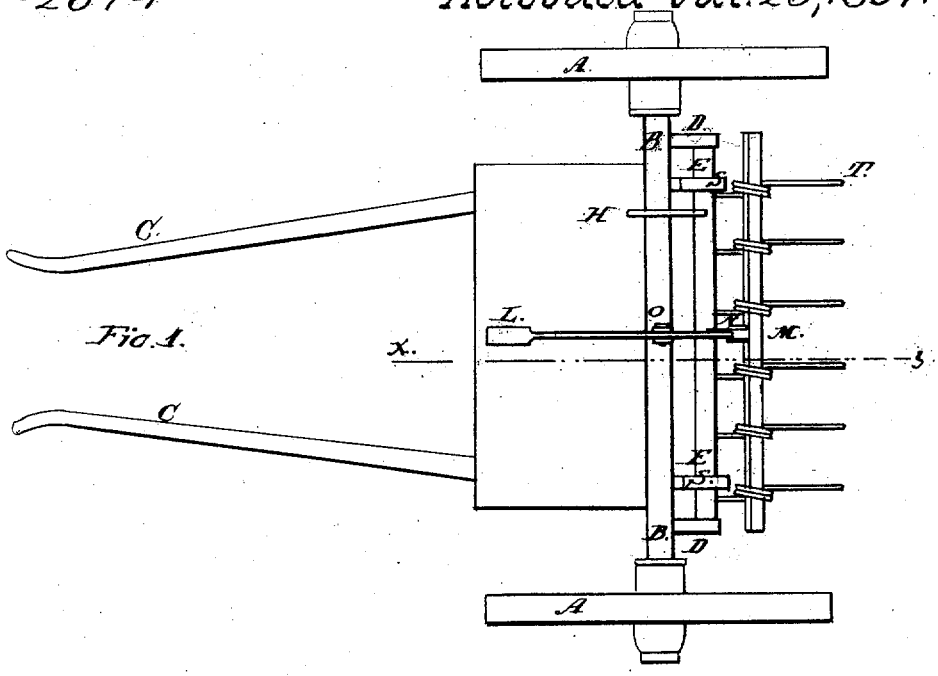
Figure 2:
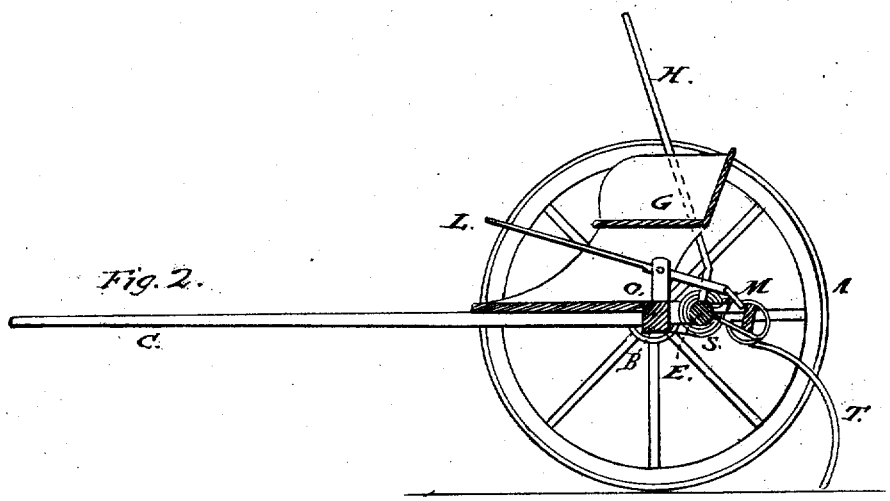

Figure 1 represents a plan or top view of a horse-rake embracing said improvements, the driver's seat being removed to show the other parts more clearly, and Figure 2 a vertical section through the same, at the line *x y* of fig. 1, with the driver's seat in place.

The machine is supported on two wheels A, mounted on an axle, B, to which the shafts C are fastened. A rocking-shaft, E, is mounted in brackets D, on the axle-tree, so as to turn axially on its trunnions. This shaft is of wrought iron, and of a size sufficient to resist the torsional strains to which it is subjected. The tines or teeth T of the rake are made of wire, and are separately and firmly secured to the rock-shaft E by suitable means. Each tooth is coiled once or twice around a bar, M, arranged parallel to the rock-shaft, and connected by a link, N, to a foot-lever, L, turning on a pivot, O, and extending in front of the driver's seat G. The coil in the teeth increases their stiffness, and enables them to resist backward strains or those caused by the teeth catching in obstructions. The bar M holds them down upon the ground uniformly, and at the same time enables them all to be simultaneously lifted by a single lever. One end of a coil-spring, S, is secured to the axle near each end of the rock-shaft, while the other is secured to the rock-shaft. These springs tend to depress the rake-teeth and keep them down upon the ground, thus obviating the employment of heavy weights or cumbrous devices to effect this result, and at the same time allow the teeth to conform to inequalities of the ground. A hand-lever, H, is likewise secured to the rock-shaft E, and extends forward within easy reach of the driver on his seat G. By depressing this lever, the rake-teeth can easily be lifted, or, should the attendant's hand be engaged, he can lift the teeth by applying pressure with his foot upon the foot-lever L. The seat G is so arranged that the operator sits over the axle-tree, or nearly so, in order to give stability to the apparatus, to render the draught easier, and to afford the best facilities for controlling the mechanism.

By reference to the drawings, it will be seen that the entire mechanism, except the front of the shafts and the rear end of the rake-teeth, is located between the wheels and within their periphery, which arrangement secures lightness, compactness, and convenience.

What is claimed herein as the invention of the said MARTZ is—

1. The combination, in a two-wheeled wire-tooth horse-rake, of a rock-shaft to support the rake-teeth, located between the wheels and within their periphery, with a foot-lever and a hand-lever to raise or lower the teeth, and a seat to support the driver while operating the levers.

2. Supporting the upper ends of the wire teeth of a two-wheeled horse-rake by an iron rock-shaft or rod, arranged parallel to the axle, or nearly so, within the periphery of the wheels.

3. In combination with a two-wheeled horse-rake having a stationary axle, a support for the teeth, located within the periphery of the wheels, a seat for the driver, and a hand-lever and a foot-lever by which to raise or lower the teeth.

4. The combination with the rake-teeth of two bars arranged within the periphery of the wheels and parallel to each other, one to sustain the teeth against backward strain while the other keeps them the proper distance apart, a lever to raise or lower the teeth, and a driver's seat from which the lever is operated.

5. In combination with a two-wheeled wire-tooth horse-rake, the support for the teeth, located within the periphery of the wheels, the lever to raise or lower the teeth, the seat for the driver, from which the lever is operated, and the springs S′, arranged and operating substantially as described, to assist in holding the teeth to the ground.

6. In combination with a two-wheeled wire-tooth horse-rake, a driver's seat, a hand-lever, by which the driver while in his seat can raise or lower the teeth, and a rock-shaft, independent of the axle, to support the teeth, each being located between the wheels and within their periphery.

7. In combination with a two-wheeled wire-tooth horse-rake, having the upper end of the teeth attached to a rock-shaft located between the wheels and within their periphery, a driver's seat, and foot-lever to raise or lower the teeth.

ADAM R. REESE.

Witnesses:

CHAS. M. LUDWIG,

LEWIS C. REESE.